United States Patent [19]
Michimata

[11] Patent Number: 5,204,292
[45] Date of Patent: Apr. 20, 1993

[54] OPTICAL GLASS FOR A PRESS LENS

[75] Inventor: Tooru Michimata, Nagaoka, Japan

[73] Assignee: Alps Electric Co., Ltd., Tokyo, Japan

[21] Appl. No.: 678,788

[22] Filed: Apr. 1, 1991

[30] Foreign Application Priority Data

Apr. 19, 1990 [JP] Japan ................................ 2-103831

[51] Int. Cl.$^5$ ........................ C03C 3/064; C03C 3/108
[52] U.S. Cl. ........................................ 501/61; 501/75; 501/903
[58] Field of Search ............................ 501/75, 61, 903

[56] References Cited

U.S. PATENT DOCUMENTS 4,460,696 7/1984 Harada et al. .................... 501/903
4,562,162 12/1985 Sagara ................................ 501/75

FOREIGN PATENT DOCUMENTS 2519009 11/1975 Fed. Rep. of Germany ........ 501/75
56-59641 5/1981 Japan .

Primary Examiner—Mark L. Bell
Attorney, Agent, or Firm—Guy W. Shoup; Laura Terlizzi

[57] ABSTRACT

An optical glass for a press lens composed of 25 to 41 mol % of $SiO_2$, 10 to 30 mol % of $B_2O_3$, 18 to 40 mol % of PbO, 1 to 10 mol % of $Na_2O$, 1 to 15 mol % of $K_2O$, 2 to 20 mol % of $Li_2O$, and 0.3 to 3 mol % of $Al_2O_3$.

1 Claim, 4 Drawing Sheets

OPTICAL GLASS FOR A PRESS LENS

BACKGROUND OF THE INVENTION

1. Field of the Invention

The present invention relates to optical glass, and more particularly, to optical glass having low melting point and which is suitable for a press lens.

2. Description of the Related Art

There has been, as shown in Japanese Patent Application Laid-open Specification Nos. 56-59641, 56-149343 and the like, a study for a press lens which can be produced by press molding a glass heated above a softening point in a metal mold without having to subsequently grind and polish glass.

When producing such kind of press lens, there has been problem regarding the melting point of optical glass employed. When the melting point is high, the metal mold used for molding can readily cause roughness of the surface by oxidation and the like and the life of the metal mold is thus shortened. Accordingly, it may be said that such optical glass having a low melting point is advantageous.

On the other hand, such press lenses are generally applied to minute parts so that the specific gravities of these presses must be as small as possible. It is preferable to decrease the thermal expansion coefficient since the contraction amount of the press lens must be small. In addition, the press lens naturally needs to have excellent weather-resistent characteristics.

As to optical glass, lenses having an intermediate index of refraction of 1.65 to 1.75 are widely available commercially. There has been a need for producing a lens having an intermediate index of refraction by press molding. In view of foregoing problems, when the conventional glass compositions are examined, SK glass and the like are difficult for press lenses since they have a higher melting point than that of SF series optical glass.

In conventional SF series glass, there have been known glass having components of $SiO_2$, $Al_2O_3$, $Na_2O$, $K_2O$, $TiO_2$, $PbO$ and $As_2O_3$. This glass has an intermediate index of refraction of 1.75 to 1.9, specific gravity of not more than 5 g/cm$^3$, and excellent weather-proofness. In such conventional glass, the life of the metal model can not be lengthened since many of these glasses have high melting points of not less than 440° C.

In addition, in the conventional SF series, there has been no glass having an index of refraction approximately in the range of 1.65 to 1.75.

SUMMARY OF THE INVENTION

With the foregoing difficulties in view, the present invention seeks to provide an optical glass for press lenses which has a melting point of not more than 420° C., which prolongs the life of the metal mold, has a low specific gravity, an index of refraction of 1.65 to 1.75, and excellent weather-resistent characteristics.

The object of the present invention is attained by providing an optical glass for a press lens having a composition of 25 to 41 mol % of $SiO_2$, 10 to 30 mol % of $B_2O_3$, 18 to 40 mol % of $PbO$, 1 to 10 mol % of $Na_2O$, 1 to 15 mol % of $K_2O$, 2 to 20 mol % preferably 16-20 mol %, of $Li_2O$, 0.1 to 3 mol % of $Sb_2O_3$ and 0.3 to 3 mol % of $Al_2O_3$.

As has been described, the present invention is mainly composed of a specified amount of $SiO_2$, $B_2O_3$, and $PbO$. A specified amount of $Na_2O$, $K_2O$, and $Li_2O$ are also added. In addition, $Sb_2O_3$ and $Al_2O_3$ are added so that the optical glass according to the invention has a melting point of less than 420° C. and an index of refraction of approximately 1.65. At the same time, the optical glass is capable of suppressing the thermal expansion coefficient.

Accordingly, when the optical lens is produced by press molding the optical glass in a metal mold, This optical lens can prolong the life of the metal mold more than the conventional optical lens. The press lens thus obtained is light weight and highly anticorrosive. In addition, this press lens has a small thermal expansion coefficient.

DETAILED DESCRIPTION OF THE INVENTION

Figure 1:
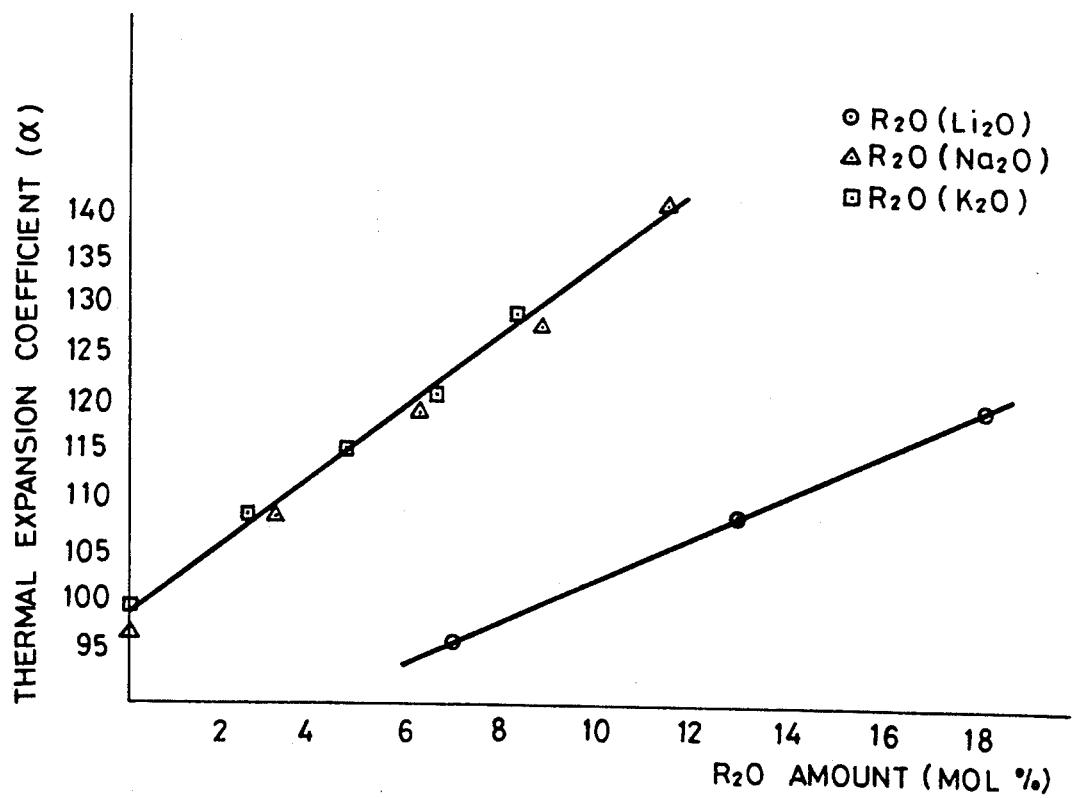
FIG. 1 is a diagram illustrating the relationship between respective additional amounts of $Li_2O$, $Na_2O$ and $K_2O$ and the thermal expansion coefficient.

The present invention will be described in further details hereunder.

The optical glass of the present invention is mainly composed of $SiO_2$, $B_2O_3$ and $PbO$. When $B_2O_3$ is added more, lower thermal expansion can be obtained. When the addition amount is in excess, the anticorrosion decreases so that the additional amount should be not more than 30 mol %. It is undesirable to determine the contents of $SiO_2$ less than 25 mol % since the durability of the glass decreases. It is also undesirable to determine the contents of $SiO_2$ more than 40 mol % since the melting point of the glass increases and the index of refraction decreases. When the contents of $PbO$ are less than 18 mol %, the refractive index decreases so that suitable glass having low melting point is difficult to obtain. When the contents of $PbO$ are more than 40 mol %, the specific gravity increases and results in decreasing the durability of the glass.

$Na_2O$, $K_2O$ and $Li_2O$ are added to decrease softening point. $Na_2O$ and $K_2O$ can lower the refractive index, however, $Li_2O$ can hardly lower the index of refraction. $Na_2O$ and $K_2O$ can increase the thermal expansion coefficient and $Li_2O$ can increase slightly the thermal expansion coefficient. For suppressing the thermal expansion coefficient, it is necessary to increase the amount of $B_2O_3$ while decreasing the amount of $Na_2O$ and $K_2O$ as small as possible.

Accordingly, in order to suppress the refractive index in the range of 1.65 to 1.75 when the melting point is reduced to not more than 420° C., to suppress the specific gravity to be not more than 5 g/cm$^2$, and to decrease the thermal expansion coefficient, the amounts of $SiO_2$, $B_2O_3$, $PbO$, $Na_2O$, $K_2O$, and $Li_2O$ are specified as follows:

Amount of $SiO_2$: 25 to 41 mol %
Amount of $B_2O_3$: 10 to 30 mol %
Amount of $PbO$: 18 to 40 mol %

Amount of $Na_2O$: 1 to 10 mol %

Amount of $K_2O$: 1 to 15 mol %

Amount of $Li_2O$: 2 to 20 mol %, preferably 16-20 mole %;

$Sb_2O_3$ can be added as antifoamer. When the additional amount of the antifoamer is less than 0.1 mol %, the glass thus obtained is difficult to exert the antifoaming effect due to the small additional amount of antifoamer. When the additional amount is more than 3 mole %, the hardness of the antifoamer is not expected to increase.

$Al_2O_3$ is suitable for stabilizing the glass by preventing crystallization. It is not suitable to add the $Al_2O_3$ in the amount of less than 0.3 mole % since this amount is too small to achieve a stabilizing effect. When the additional amount is more than 3 mole %, the glass thus obtained has high melting point.

The glass having the composition as stated earlier is produced in the following manner.

A plurality of raw materials of chemical compound are blended to form a mixture of raw materials. These raw materials are melted in a crucible and the like, and subsequently cooled down. Other known methods for producing such optical glass are also available.

The optical glass having the aforementioned composition has a melting point of not more than 420° C. and decreases oxidation of the metal mold when press molding so that the glass has an effect to prolong the life of the metal mold.

The index of refraction is in the range of 1.65 to 1.75 and is suitable for a lens having an intermediate index of refraction. In addition, since the thermal expansion coefficient is small, the rate of contraction after press molding is small.

Accordingly, the optical lens in this invention is suitable for laser optical equipments.

DESCRIPTION OF THE PREFERRED EMBODIMENTS

Samples of the optical glass having the compositions as shown in Table 1 were prepared and respective thermal expansion coefficients ($\alpha$), softening points (Tg), melting points (At) and indexes of refraction of respective samples were measured and the results were shown in Table 1.

A sample of the aforementioned optical glass is prepared in the following manner.

The raw materials of lead monooxide, silicon dioxide, boric acid, sodium carbonate, potassium carbonate, and lithium carbonate were mixed in a predetermined ratio. The mixture was melted in a crucible (platinum) and antifoamed at approximately 1100° C. and clarified at 850° C. The resulting mixture was cast into a pre-heated metal mold having 410° C., subsequently gradually lowered.

The sample of the glass composition in the present invention has a melting point of not more than 420° C. The thermal expansion coefficient is not more than 130, and the index of refraction is in the range of 1.65 to 1.7.

On the other hand, when a sample had a composition departing from the scope of the composition of the present invention, the sample had factors of a thermal expansion coefficient and a melting point, one of the factors being deviated from the predetermined values.

As a result, it has been apparent that the range of composition specified by the present invention is preferable from the above result.

TABLE 1-1

| Sample No | PbO | $Al_2O_3$ | $Na_2O$ | $K_2O$ | $SiO_2$ | $B_2O_3$ | $Li_2O$ | $Sb_2O_3$ |
|---|---|---|---|---|---|---|---|---|
| 1 | 19.67 | 0.66 | 2.72 | 14.34 | 36.54 | 14.55 | 11.30 | 0.20 |
| 2 | 19.32 | 0.65 | 2.68 | 2.20 | 35.88 | 27.98 | 11.10 | 0.20 |
| 3 | 19.56 | 0.66 | 2.71 | 7.58 | 36.34 | 21.71 | 11.24 | 0.20 |
| 4 | 19.75 | 0.67 | 2.74 | 10.35 | 36.68 | 18.26 | 11.35 | 0.20 |
| 5 | 28.06 | 0.62 | 2.55 | 2.12 | 36.79 | 18.75 | 10.92 | 0.18 |
| 6 | 27.25 | 0.61 | 2.52 | 2.10 | 36.34 | 19.71 | 11.48 | 0.00 |
| 7 | 27.49 | 0.59 | 2.41 | 2.01 | 42.84 | 15.48 | 9.01 | 0.17 |
| 8 | 20.37 | 0.73 | 2.99 | 2.46 | 44.80 | 16.00 | 12.42 | 0.22 |
| 9 | 25.49 | 0.80 | 3.28 | 2.70 | 31.28 | 22.62 | 13.60 | 0.24 |
| 10 | 23.84 | 0.78 | 3.21 | 2.64 | 28.14 | 27.85 | 13.31 | 0.24 |
| 11 | 23.67 | 0.77 | 3.19 | 2.62 | 32.88 | 23.41 | 13.22 | 0.24 |
| 12 | 21.85 | 0.76 | 3.12 | 2.56 | 27.33 | 31.22 | 12.93 | 0.23 |
| 13 | 23.10 | 0.78 | 0.00 | 2.63 | 42.90 | 17.09 | 13.27 | 0.24 |
| 14 | 21.71 | 0.73 | 6.01 | 2.47 | 40.32 | 16.06 | 12.47 | 0.22 |
| 15 | 21.07 | 0.71 | 8.76 | 2.40 | 39.14 | 15.59 | 12.11 | 0.22 |
| 16 | 20.48 | 0.69 | 11.34 | 2.33 | 38.03 | 15.15 | 11.77 | 0.21 |
| 17 | 22.97 | 0.77 | 3.18 | 0.00 | 42.66 | 16.99 | 13.20 | 0.24 |
| 18 | 21.93 | 0.74 | 3.04 | 4.50 | 40.74 | 16.23 | 12.60 | 0.23 |
| 19 | 21.50 | 0.72 | 2.98 | 6.37 | 39.94 | 15.91 | 12.36 | 0.22 |
| 20 | 23.92 | 0.81 | 3.31 | 2.72 | 44.43 | 17.69 | 6.87 | 0.25 |
| 21 | 21.03 | 0.71 | 2.91 | 2.40 | 39.60 | 15.56 | 15.56 | 0.22 |
| 22 | 19.28 | 0.65 | 2.67 | 2.20 | 35.81 | 14.26 | 24.93 | 0.20 |
| 23 | 17.80 | 0.60 | 2.47 | 2.03 | 33.07 | 13.17 | 30.69 | 0.18 |

FIG. 1 shows the varying rate of thermal expansion coefficients to respective additional amounts of $Li_2O$, $Na_2O$ and $K_2O$.

From the result as illustrated in FIG. 1, it has revealed that the thermal expansion coefficient increases by increasing the amount of $K_2O$ and $Na_2O$. In addition, it has been clear that the thermal expansion coefficient increases at the lower rate by increasing the amount of $Li_2O$ than that by the addition of $K_2O$ and $Na_2O$.

Figure 2:
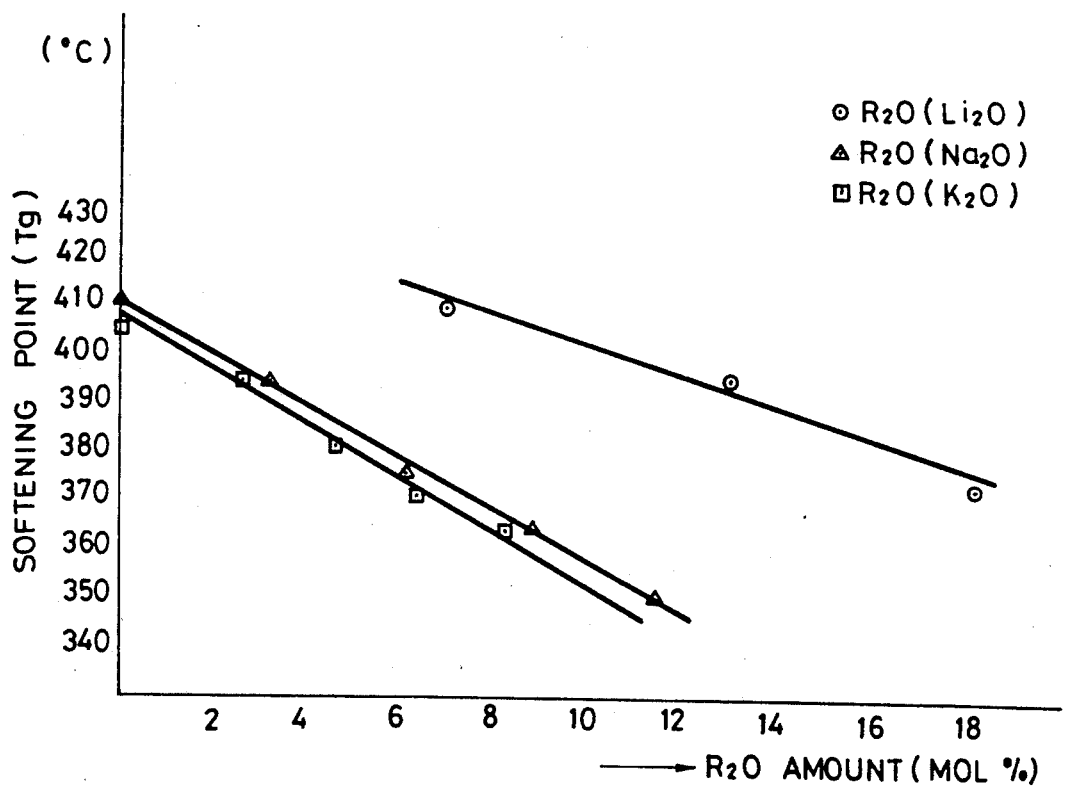
FIG. 2 is a diagrammatic illustration of the relationship between respective additional amounts of $Li_2O$, $Na_2O$ and $K_2O$ and the softening point.

FIG. 2 shows the varying rate of softening point to respective amounts of $Li_2O$, $Na_2O$ and $K_2O$.

TABLE 1-2

| Sample | Thermal expansion coefficient $\alpha$ | Softening point Tg | Melting point At | Index of refraction Nd | Specified gravity $\rho$ |
|---|---|---|---|---|---|
| 1 | 90.0 | 405.0 | 432 | 1.67 | 3.7 |
| 2 | 97.8 | 412.0 | 443 | 1.676 | 3.7 |
| 3 | 114.4 | 378.0 | 408 | 1.673 | 3.7 |
| 4 | 127.2 | 355.0 | 388 | 1.669 | 3.7 |
| 5 | 109.5 | 380.0 | 408 | 1.743 | 4 |
| 6 | 108.1 | 382.0 | 408 | 1.738 | 4 |
| 7 | 101.8 | 392.0 | 422 | 1.733 | 4 |
| 8 | 103.4 | 385.0 | 435 | 1.683 | 4 |
| 9 | 113.3 | 373.0 | 405 | 1.723 | 4 |
| 10 | 114.3 | 388.0 | 413 | 1.713 | 4 |
| 11 | 111.0 | 384.0 | 411 | 1.712 | 4 |
| 12 | 106.4 | 397.0 | 426 | 1.696 | 4 |
| 13 | 97.7 | 412 | 441 | 1.704 | 4 |
| 14 | 119.8 | 376 | 407 | 1.697 | 4 |
| 15 | 128.8 | 376 | 397 | 1.692 | 4 |
| 16 | 141.4 | 351 | 380 | 1.687 | 4 |
| 17 | 99.9 | 406 | 436 | 1.709 | 4 |
| 18 | 116.0 | 381 | 414 | 1.694 | 4 |
| 19 | 122.1 | 371 | 404 | 1.688 | 4 |
| 20 | 96.5 | 410 | 444 | 1.698 | 4 |
| 21 | 120.5 | 374 | 403 | 1.702 | 4 |
| 22 | 109 | 395 | 424 | 1.702 | 4 |
| 23 | 105 | 407 | 435 | 1.688 | 4 |

Figure 3:
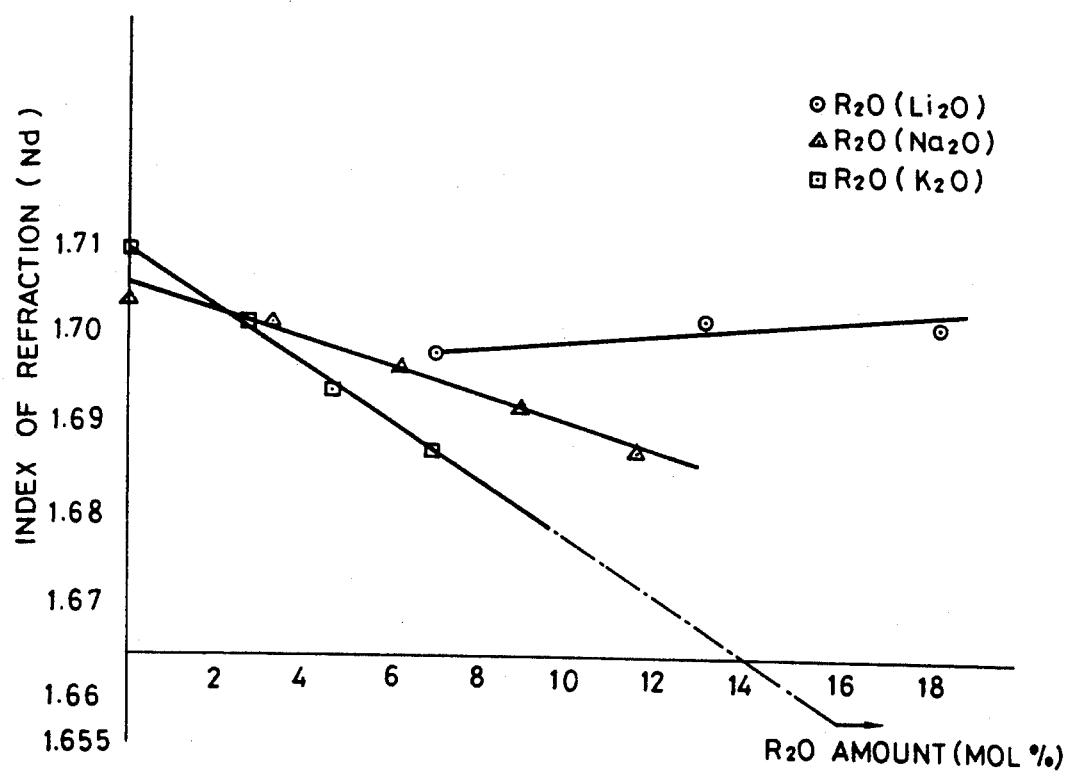
FIG. 3 shows a diagram illustrating the relationship between respective additional amounts of $Li_2O$, $Na_2O$ and $K_2O$ and the index of refraction.

As illustrated in FIG. 2, it has been apparent that when $Na_2O$ and $K_2O$ were added, the decreasing rate of the softening point was large. FIG. 3 shows that the varing rates of the index of the refraction to respective amounts of $LiO_2$, $Na_2O$, and $K_2O$.

From FIG. 3, it has been clear that the index of refraction decreases by the addition of $Na_2O$ and $K_2O$. In addition, it has revealed that the index of the refraction hardly changes by the addition of $Li_2O$.

Figure 4:
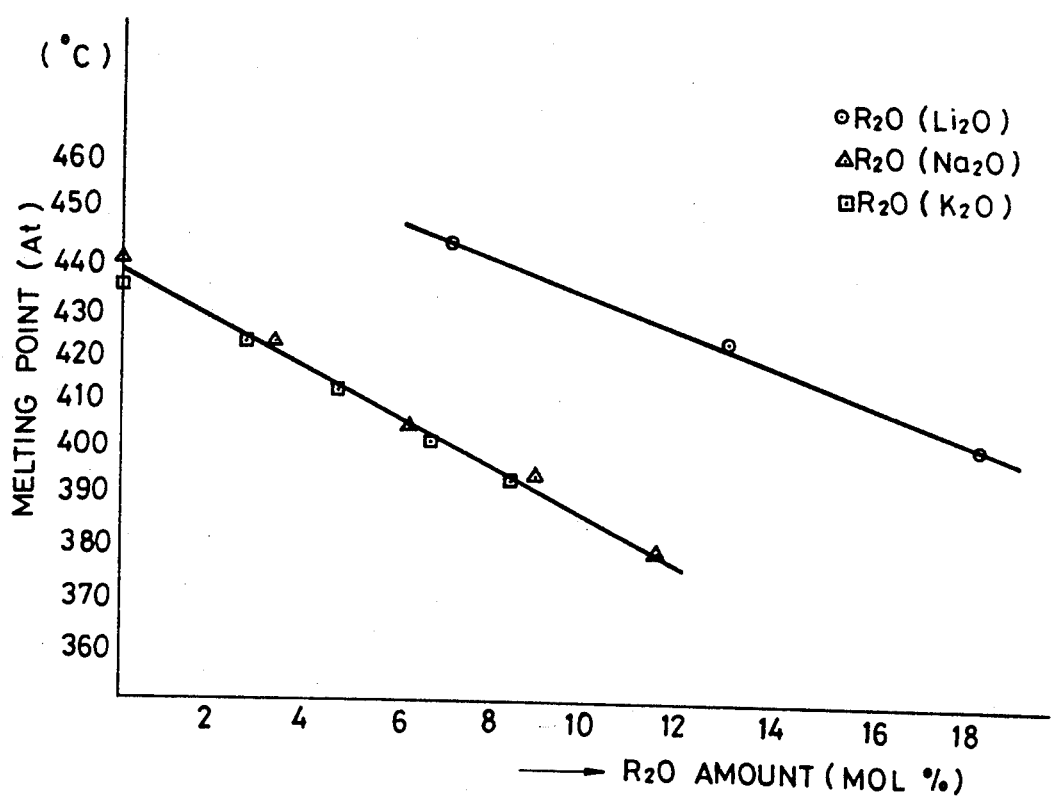
FIG. 4 is a diagram illustrating the relationship between respective additional amounts of $Li_2O$, $Na_2O$ and $K_2O$ and the melting point.

FIG. 4 shows the varying rate of the melting point to respective amounts of $Li_2O$, $Na_2O$, and $K_2O$.

From FIG. 4, it has been clear that the decreasing rate of the melting point when adding $Na_2O$ and $K_2O$ was large but small when adding $Li_2O$.

What is claimed is:
1. An optical glass for a press lens having a composition of 25 to 41 mol % of $SiO_2$, 10 to 30 mol % of $B_2O_3$, 18 to 40 mol %, of PbO, 1 to 10 mol % of $Na_2O$, 1 to 15 mol % of $K_2O$, 16 to 20 mol %, of $Li_2O$, 0.3 to 3 mol %, of $Al_2O_3$, and 0.1 to 3 mol % of $Sb_2O_3$.

* * * * *